Aug. 22, 1950     H. E. NEELY     2,519,847
PIPE COUPLING
Filed Nov. 13, 1948     2 Sheets-Sheet 1
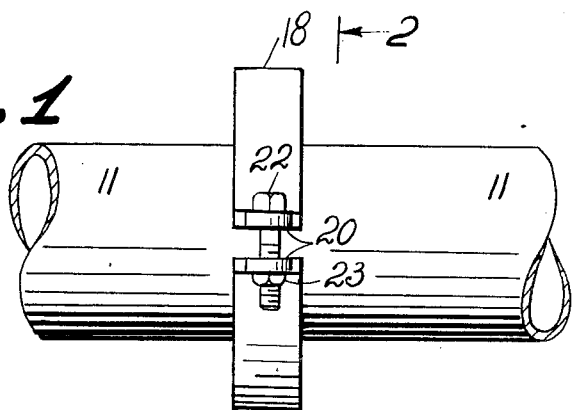
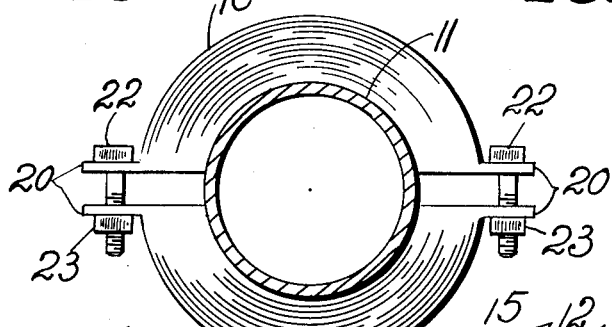
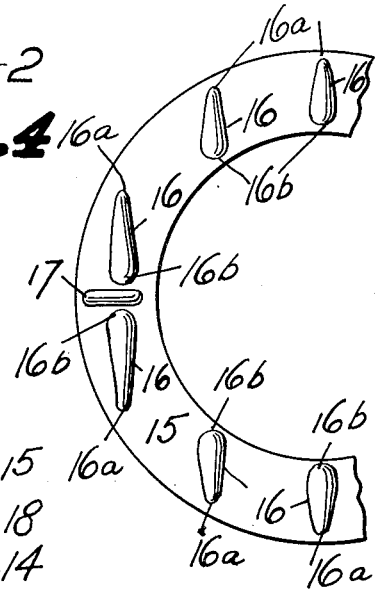
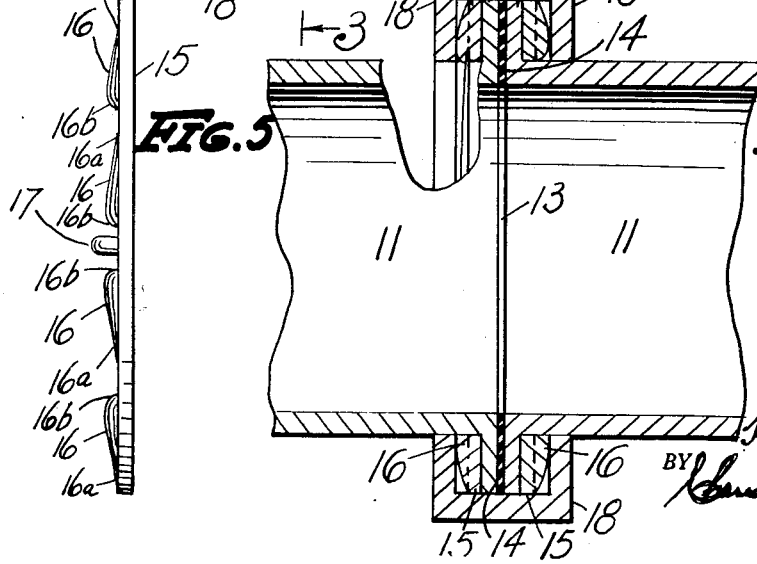
INVENTOR.
Horace Ellsworth Neely
BY
his attorney Aug. 22, 1950 — H. E. NEELY — 2,519,847
PIPE COUPLING
Filed Nov. 13, 1948 — 2 Sheets-Sheet 2
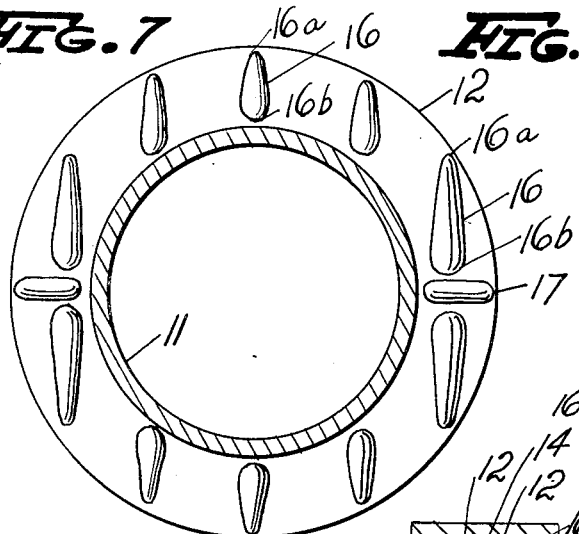
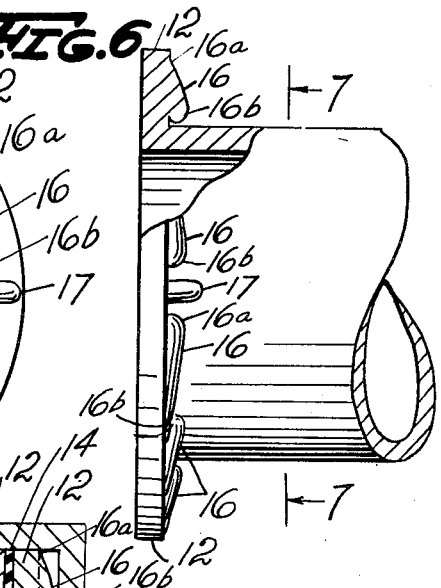
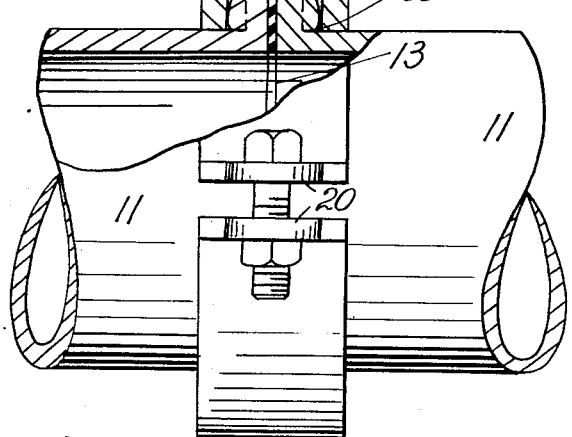
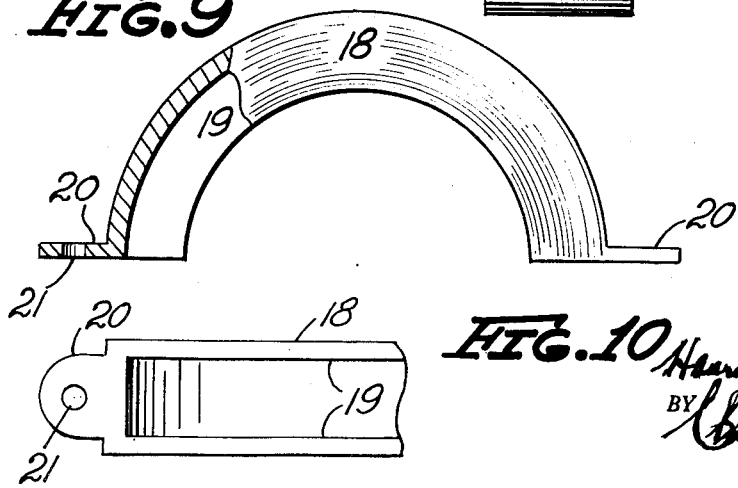
INVENTOR.
Hearne Ellsworth Neely
BY his attorney Patented Aug. 22, 1950

2,519,847

UNITED STATES PATENT OFFICE 2,519,847

PIPE COUPLING

Hearne Ellsworth Neely, Queens Village, N. Y.

Application November 13, 1948, Serial No. 59,827

7 Claims. (Cl. 285—129)

My invention relates to a pipe coupling and its novelty resides in the adaptation and combination of parts as will be more fully hereinafter pointed out.

There have been many attempts to solve the problem of effecting a tight flange joint or lap joint between two sections of pipe which is simple and can be readily assembled and disassembled easily and quickly with the pressure at the inner edge of the flange but none of these have solved this problem.

My device not only solves this problem most effectively but does so in a simple inexpensive and practical manner and for the first time places the greatest pressure around the inner edge of the flanges instead of around the outer edges of the flanges as in the prior art devices thereby effecting a more perfect and stronger joint.

Referring to the drawings—

Fig. 1 is a side elevation of my pipe coupling in position on the joint of two pipes which are broken away at their outer ends for convenience in illustration;

Fig. 2 is an end view of the same looking in from the right hand end on line 2—2 of Fig. 1;

Fig. 3 is a vertical section on the line 3—3 of Fig. 2 with a portion broken away to show the interior structure;

Fig. 4 is a top plan view of a pressure ring of one embodiment of my device with a portion broken away for convenience in illustration;

Fig. 5 is a side elevation of Fig. 4;

Fig. 6 is a side elevation of a second embodiment of my device in which a pipe and flange with the pressure elements are made integral with the flange, a portion of the pipe being broken away for convenience in illustration;

Fig. 7 is a section on the line 7—7 of Fig. 6;

Fig. 8 is a side elevation of my complete coupling with flanges as shown in Figs. 6 and 7 and part being broken away to show the interior construction;

Fig. 9 is a side elevation of one of the half housings; and

Fig. 10 is a bottom plan view of the same with a portion broken away for convenience in illustration.

In the drawings, 11 are metal pipe sections having integral flanges 12 which together form the usual lap joint 13 between which is mounted the usual gasket 14 of flexible material to effect a tight joint.

Over the pipes 11 are slidably mounted pressure rings 15 of suitable metal on the outer faces of which are integrally formed wedge shaped protrusions 16 all of which are in absolute alignment with each other and have lower points 16a and high points 16b and a guide element 17 is made integral with said rings 15 so that it projects above the wedge protrusions 16 and acts as a guide for both housing halves 18 to insure perfect alignment of both sets of wedge protrusions 16 so that both said housing halves 18 will slide up onto both sets of said wedges 16, uniformly and evenly.

Said housing halves 18 are constructed of a suitable metal and each have inner side walls 19 which are spaced accurately so as to ride up on the perfectly aligned wedge elements 16 from the lower ends 16a and put binding pressure on the high portions 16b of the wedge elements 16.

The housing halves each have integral tabs 20 at each end in which are holes 21 through each adjacent pair of which threaded bolts 22 are adapted to be placed and over said bolts 22 threaded nuts 23 are adapted to be screwed to draw said two housing halves together up onto the aligned wedge elements 16 and lock said housing halves rigidly in position over said lap joint 13.

In my device, there is the alternative structure of the aligned wedge shaped protrusions 16 being formed directly on the flange 12 as shown in Figs. 6, 7 and 8, or the use of pressure rings 15 with the aligned wedge shaped protrusions 16 formed on said rings as shown in Figs. 3, 4 and 5.

In assembling my device in actual use, the lap joint formed by two pipe ends 11 with flanges 12 coming together with a gasket 14 mounted between will have pressure rings 15 mounted over each pipe 11 back of the flanges 12 so that the aligned wedge shaped protrusions 16 face outwardly away from the flanges 12. The housing halves 18 guided by guide elements 17 will both be directed in alignment with aligned protrusions 16 up onto the same starting at the lowest points 16a of said protrusions 16 and sliding up thereon and as the bolts 22 placed through the adjacent holes 21 in tabs 20 of said housing halves 18 and the nuts 23 are tightened up on said bolts 22 the housing halves will be drawn toward each other so that the side walls 19 of the housing halves will slide up on aligned wedge shaped protrusions 16 from 16a to 16b so as to effect a uniform pressure around the inner edge of the flanges 12 and secure an air, gas and liquid tight joint in locked position.

In the structure shown in Figs. 6, 7 and 8 the aligned wedge shaped protrusions 16 are integral with the flanges 12 so that no pressure rings 15 are necessary but otherwise the assembly will be the same as with the pressure rings 15.

My structure is adapted for light or heavy pipe construction and may be used in connection with materials other than metal.

The shape of the aligned wedge shaped protrusions 16 may vary but in order to secure a uniform pressure around the inner edge of the flanges 12 it is necessary that said protrusions 16 be in absolute alignment as to both flanges 12 and that the high point of the protrusions 16 be adjacent the inner edges of the flanges 12.

Many variations may be made in the device as shown and described without departing from the spirit and intent of the same and which variations are encompassed in the claims herein.

I claim:

1. A pipe coupling comprising two pipes having abutting pipe flanges, said flanges having on their back faces wedge shaped protrusions in alignment running in from the outer edge of the flange to the inner edge of same, a gasket between said flanges, two housing halves, guide elements for said two housing halves on each of said flanges said two housing halves being adapted to slide up on each of said aligned wedge shaped protrusions and flanges and locking means to draw and lock them together to effect a liquid and gas tight joint.

2. In a pipe coupling, two pipes having abuting pipe flanges, a gasket between said flanges, a pressure locking ring mounted over each of said pipes adjacent said flanges and having wedge shaped protrusions in alignment on the outer side of same running up from the outer edge of the rings to the inner edges of same, two housing halves, a guide element on the outer edge of each of said locking rings for said two housing halves, said two housing halves being adapted to slide up on the aligned wedge shaped protrusions of each of said pressure rings and locking means to draw up and lock them thereover to effect a water and gas tight joint.

3. In a pipe coupling, the combination of two pipe sections having abutting integral flanges at one end, wedge shaped protrusions in alignment on the back of each of said flanges with the high portion of said wedges adjacent the inner edge of said flanges, a gasket between said abutting flanges, half housing members adapted to slide up on said wedges and effect pressure on the high portions of said wedges, guide elements for said housing members on the outer edge of each of said flanges, and locking means comprising tabs integral with and projecting from the open ends of each of said half housing members and holes in said tabs through which bolts and nuts are mounted to draw up and lock them tightly in place.

4. A pipe coupling comprising two pipes having abutting pipe flanges, said flanges having on their back faces protrusions with highest portions adjacent the inner edge of the flanges in alignment running in from the outer edge of the flange to the inner edge of same, a gasket between said flanges, two housing halves, said two housing halves being adapted to slide up on each of said aligned protrusions with the highest portions adjacent the inner edge of the flanges and locking means to draw and lock them together to effect a liquid and gas tight joint.

5. In a pipe coupling, two pipes having abutting pipe flanges, a gasket between said flanges, a pressure locking ring mounted over each of said pipes adjacent said flanges and having protrusions in alignment and with the highest portions adjacent the inner edges of the flanges and said protrusions being on the outer side of said locking rings, two housing halves adapted to slide up and onto the aligned protrusions with the highest portions adjacent the inner edges of the flanges of each of said pressure rings and locking means to draw up and lock said housing halves thereover to effect a water and gas tight joint.

6. In a pipe coupling, the combination of two pipe sections each having an integral flange at one end adapted to abut each other, protrusions with the highest portions adjacent the inner edge of the flanges and in alignment on the back of each of said flanges, a gasket between said abutting flanges, half housing members adapted to slide up on all of said aligned protrusions and effect pressure on the high portions of said protrusions around the inner edges of the flanges and locking means comprising tabs integral with and projecting from the open ends of each of said half housing members and holes in said tabs through which threaded bolts and nuts are mounted to draw up and lock said half housings tightly in place.

7. In a pipe coupling, the combination of two pipe sections each having an integral flange at one end which flanges are adapted to abut each other said flanges having on their back faces sloping protrusions with the highest portions adjacent the inner edge of the flanges and all of said protrusions being in alignment running in from the outer edge of the flanges, a gasket between said flanges, two housing halves, said two housing halves being adapted to slide up on said sloping aligned protrusions and locking means to draw up said housings onto the highest portions of all of said sloping aligned protrusions and effect the greatest pressure around the inner edges of both of said flanges and lock said flanges together in a liquid and gas tight joint.

HEARNE ELLSWORTH NEELY.

REFERENCES CITED

The following references are of record in the file of this patent:

UNITED STATES PATENTS

| Number | Name | Date |
|---|---|---|
| 711,946 | Day | Oct. 28, 1902 |
| 712,014 | Smith et al. | Oct. 28, 1902 |
| 2,214,381 | Rastetter | Sept. 10, 1940 |